(12) United States Patent
Marszalek

(10) Patent No.: US 6,401,861 B1
(45) Date of Patent: Jun. 11, 2002

(54) ADJUSTABLE FLOATING LADDER FOR LOADING A DUMPSTER

(75) Inventor: Stephen James Marszalek, Beverly Hills, MI (US)

(73) Assignee: Great Lakes Construction Services, Beverly Hills, MI (US)

(*) Notice: Subject to any disclaimer, the term of this patent is extended or adjusted under 35 U.S.C. 154(b) by 0 days.

(21) Appl. No.: 09/611,239

(22) Filed: Jul. 6, 2000

(51) Int. Cl.[7] .................................................. E06C 9/00
(52) U.S. Cl. ............................ 182/84; 182/86; 182/206
(58) Field of Search .............................. 182/84–86, 91, 182/97, 95, 206, 115

(56) References Cited

U.S. PATENT DOCUMENTS

| 381,429 A | | 4/1888 | Scott | |
|---|---|---|---|---|
| 383,902 A | * | 6/1888 | Nicholas | 182/97 |
| 599,666 A | | 2/1898 | Thornton et al. | |
| 1,068,890 A | * | 7/1913 | Gohlke | 182/95 |
| 1,195,869 A | * | 8/1916 | Taylor | 182/95 |
| 2,415,658 A | * | 2/1947 | Rusk | |
| 2,551,345 A | | 5/1951 | Scott | |
| 3,780,829 A | | 12/1973 | Wallingford | |
| 3,892,290 A | * | 7/1975 | Lang | 182/206 |
| 4,482,029 A | | 11/1984 | Prochaska | |
| 4,531,613 A | | 7/1985 | Keigher | |
| 4,742,888 A | | 5/1988 | Amacker | |
| 6,116,378 A | * | 9/2000 | Barrow | 182/127 |

FOREIGN PATENT DOCUMENTS

| GB | 3342 | * | 9/1877 | ................... 182/95 |

* cited by examiner

Primary Examiner—Alvin Chin-Shue
(74) Attorney, Agent, or Firm—Brooks & Kushman P.C.

(57) ABSTRACT

A free-floating step ladder which can hang on the rim of a trash dumpster has a stepless hook portion for hanging the ladder on the dumpster, a platform to stand on while loading the dumpster, and a stairway from the platform which extends adjustably toward the ground on which the dumpster rests without touching the ground.

3 Claims, 3 Drawing Sheets

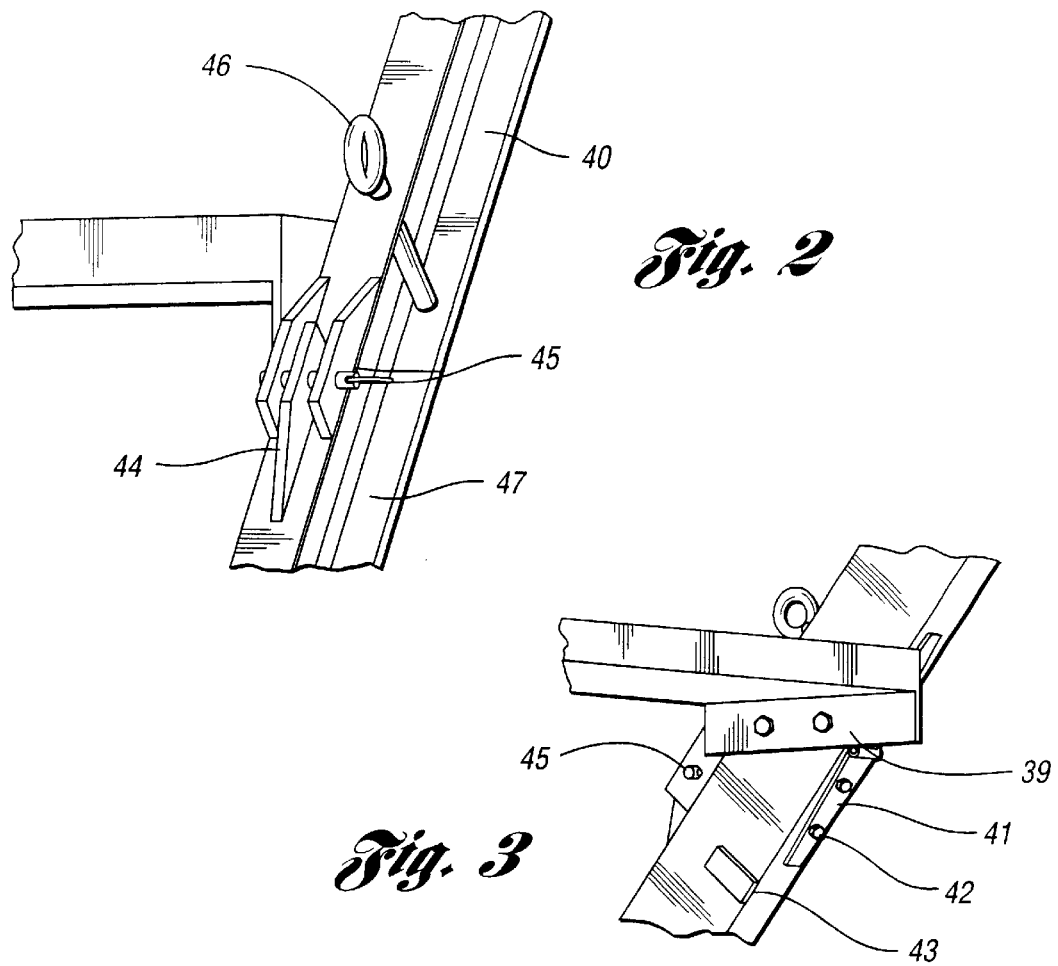
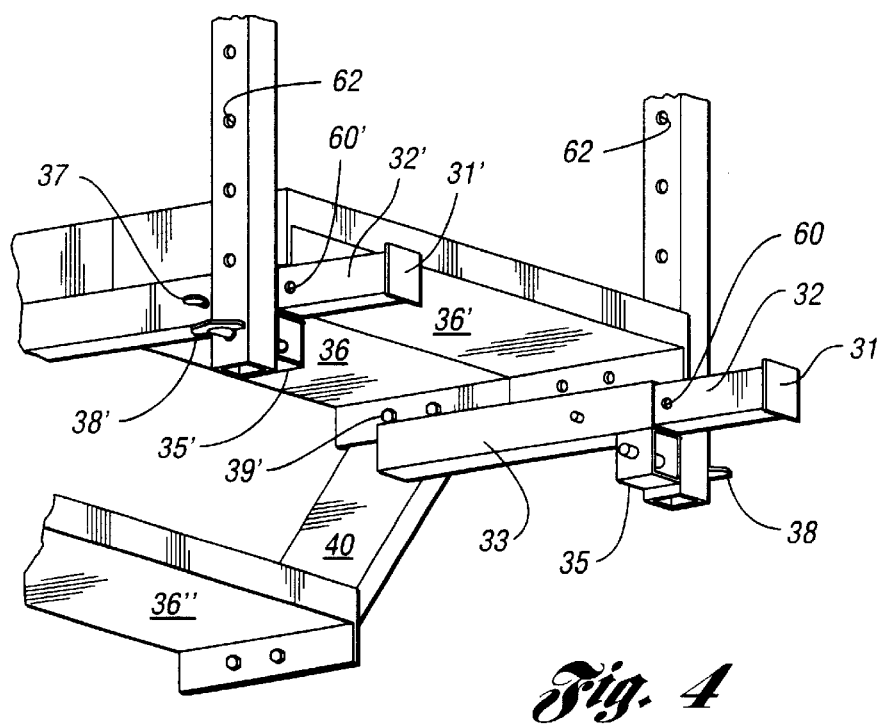

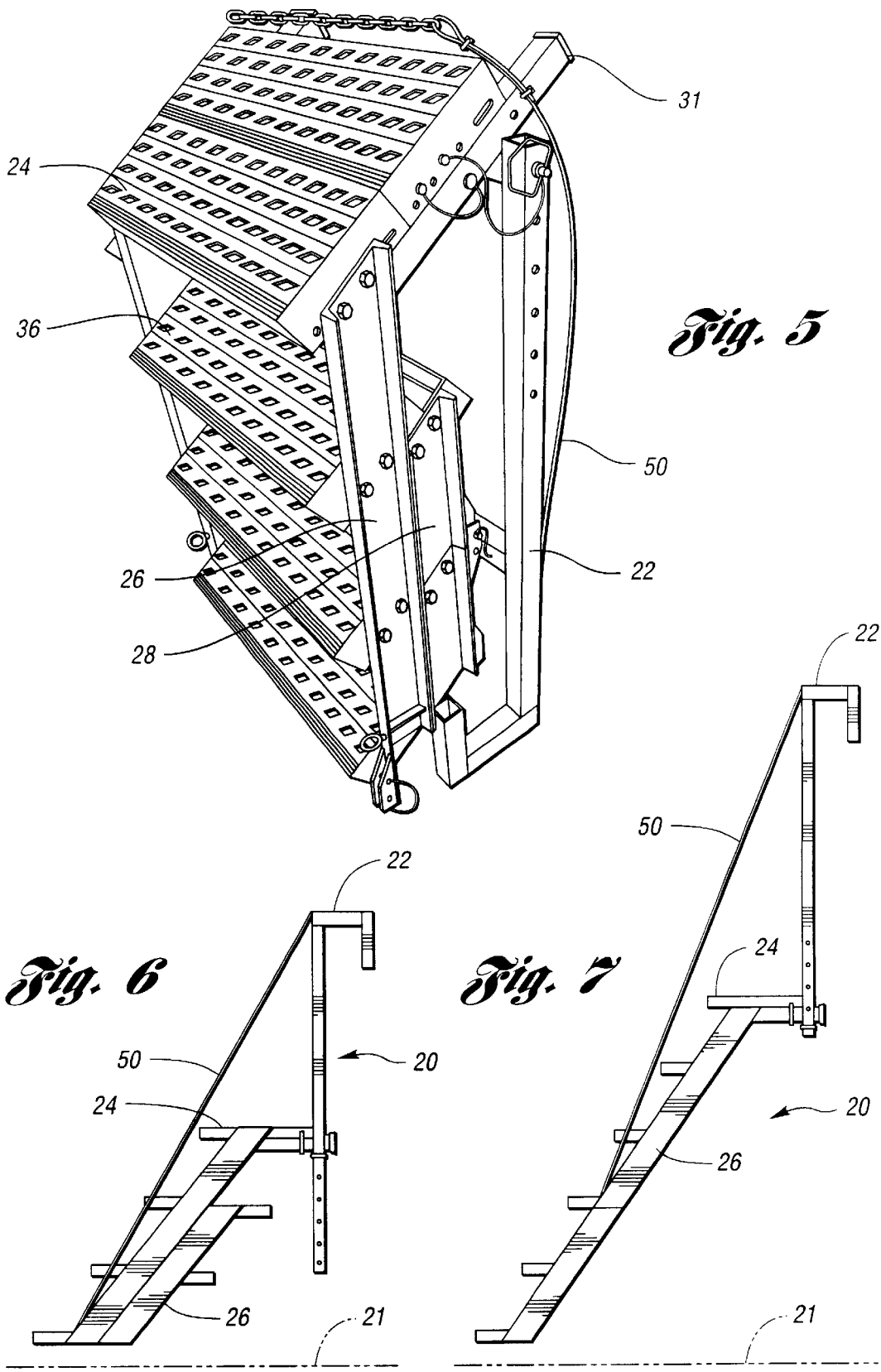

ADJUSTABLE FLOATING LADDER FOR LOADING A DUMPSTER

TECHNICAL FIELD

This invention relates to ladders which are adjustable to accommodate dumpsters having side walls of different heights or shapes.

BACKGROUND ART

There is a great need for dumpster loading apparatus that will facilitate the safe and efficient loading of debris into conventional construction site dumpsters. Customary methods of filling dumpsters have been found to be time inefficient and unsafe.

Currently, dumpsters are loaded by two conventional methods. The first one of these methods is the carrying of the debris through the dumpster door. This process entails that a worker walk an additional distance to the entrance of the dumpster, walk to the accumulation of trash inside the dumpster, and finally unload the debris onto the pile. The problem with this method is that it is time consuming. The second method is the removal of waste or debris by throwing it over the side wall of the dumpster. This process is also inefficient in that it does not allow for the effective piling of debris in the dumpster because the thrower cannot see where the refuse will land.

Prior art designs disclose step ladder systems that attach to the rear of trucks or campers. Such systems are deficient in transportability, foldability, attachability and size.

More particularly, U.S. Pat. No. 4,482,029, issued Nov. 13, 1984, to Prochaska, discloses a ladder assembly for a truck box. The ladder remains vertical regardless of the inclination of the truck box. An outer frame of the ladder is pivotally connected to an inner frame with steps in between.

U.S. Pat. No. 381,429, issued Apr. 17, 1888, to Scott, discloses wagon steps which hang from the wagon box. The steps are pivotable on side supports which are foldable.

U.S. Pat. No. 599,666, issued Feb. 22, 1898, to Thornton & Moody, discloses portable wagon steps which hang on a wagon bed and are foldable compactly when not in use.

Other foldable ladders have been disclosed for boarding boats and planes, such as U.S. Pat. No. 2,551,345, issued May 1, 1951, to Scott, and U.S. Pat. No. 3,892,290, issued Jul. 1, 1975, to Lang.

Such prior art fails to solve the problems faced in efficiently loading a trash dumpster which may be resting on a shifting or unstable ground support.

By creating a portable ladder that allows the worker to see over the top of the dumpster, the problem of inefficient packing will be alleviated. The time factor will also be greatly improved through the strategic placing of the ladder, which will eliminate the need to walk the extra distance to the dumpster door. By preventing the workers from throwing the waste or debris over the side wall, and by removing the threat of navigating through the dumpster's door to pile debris, a more convenient way of disposing debris at construction sites has been invented.

DISCLOSURE OF INVENTION

The dumpster loader of this invention is an attached, free-floating step ladder system with raised platform that has foldable and telescoping characteristics.

Accordingly, it is an object of this invention to provide an improved ladder which allows workers to load dumpsters more quickly and efficiently.

It is another object that the improved ladder of this invention be sufficiently compactable and lightweight to be portable, both between construction sites and around the dumpster.

Another object of the invention is an improved portable ladder which is adjustable to accommodate all dumpsters and landscapes and easily assembled and set up on the dumpster.

Another object of the invention is a free-floating step ladder which has a hanger adapted for hanging on an upper rim of a dumpster possibly supported on unstable sand or ground. The ladder has a platform affixable to the hanger and a stairway extending from the platform and supported from the hanger by a flexible or adjustable means extending restrictively toward the ground so that the stairway is prevented from touching the ground sufficiently that the ladder will not sink into the unstable ground which supports the dumpster.

A more specific object of the invention is a portable ladder to aid a worker in loading dumpsters of different heights which are on a dumpster support which may be unstable. The ladder has a stepless hook portion adapted for connecting the ladder to a dumpster of predetermined height and shape. It also has a platform portion for the worker to stand on which is adjustably positionable with respect to the hook portion and affixable to the hook portion at a desired position alongside the dumpster sufficient to enable the worker when on the platform portion to see how to load the dumpster. The ladder has a stairway portion depending from the platform portion, and a flexible support for the ladder portion suspended from the hook portion and positionable at an angle sufficient with respect to the dumpster support for spacing the ladder portion above the dumpster support.

The ladder may also have a fixed section of the stairway portion positionable with respect to the platform portion by the flexible support and one or more foldable sections pivotable with respect to the fixed section so that the fixed section and foldable sections can lay side by side when the dumpster has a short side wall so as to clear the ground when in use or to make the ladder compact and portable.

The ladder may also have a foldable portion which is extendable toward the dumpster supporting site when the hook portion is connected to a dumpster having a taller side wall or a different rim shape so that the hook portion can be adjusted or reshaped to fit the top rim of the dumpster and the bottom of the ladder can remain spaced from the ground on which the dumpster is placed.

In general, the dumpster ladder of this invention is a small set of stairs that can be placed in front of the dumpster and locked onto the dumpster rim for stability. The hook that locks the stairs in place is adjustable for dumpsters of different height and rim shape. The ladder of this invention is very easy to move from site to site or to different positions on the dumpster because it is relatively small and lightweight. It is also easily slid along the side of the dumpster to ensure even distribution of debris; and if workers can see where they are placing the debris, they can pack the dumpster more efficiently. The ladder is also extremely time efficient since the workers just walk up the stairs, throw away the debris, and walk down. It is not unrealistic to ask workers to climb a short flight of stairs because generally they will already have walked a reasonable distance through the work site to the dumpster. Lastly, the ladder is very durable, requires next to no maintenance, and is inexpensive to build when considering the features offered.

There may be a problem when the ladder rests on the ground of the construction site. The ground conditions may be unstable, such as sand or mud, or uneven such as where only one point of the stair feet rests on the ground to support all of the weight. Thus, the ladder design of this invention is adaptable to different dumpster applications. And for these reasons, the ladder of this invention has a floating stair design that depends entirely on the dumpster for support by being spaced from the ground on which the dumpster sets.

The floating ladder design of this invention has two foldable stairs on the bottom, two top hooks for attaching it to the dumpster, pins in the hooks to adjust the height of a standing platform and a system of metal tubes to stabilize and orient the ladder against the dumpster. This insures a level platform and treads at all times. These tubes are also adjustable to accommodate dumpsters of different height and rim shape. This floating design works well. The metal tubing is strong enough to withstand the loads on the stairs and platform. Also, the structure is light enough to be portable. Because aluminum is much lighter than steel and has a higher strength-to-weight ratio, the tubing is aluminum to reduce weight. The resultant structure is not significantly heavier at about 70 lbs. than the initial target weight of 45 lbs., i. e., the estimated weight that an average person can lift without difficulty.

Besides being stronger and weighing less, the ladder design of this invention is also less bulky and more compact.

BRIEF DESCRIPTION OF DRAWINGS

FIG. 2 is a fragmentary perspective side view of the subassembed ladder stair tread and side rail;

FIG. 3 is a fragmentary perspective bottom view of the subassembled stair tread and side rail;

FIG. 4 is a fragmentary perspective bottom view of the subassembled standing platform and hanger;

FIG. 5 is a perspective view of the ladder folded in a manner to make the ladder easily portable;

FIG. 6 is a schematic side view of the ladder in its shortest height configuration; and FIG. 7 is a schematic side view of the ladder in its tallest height configuration.

BEST MODE FOR CARRYING OUT THE INVENTION

Figure 1:
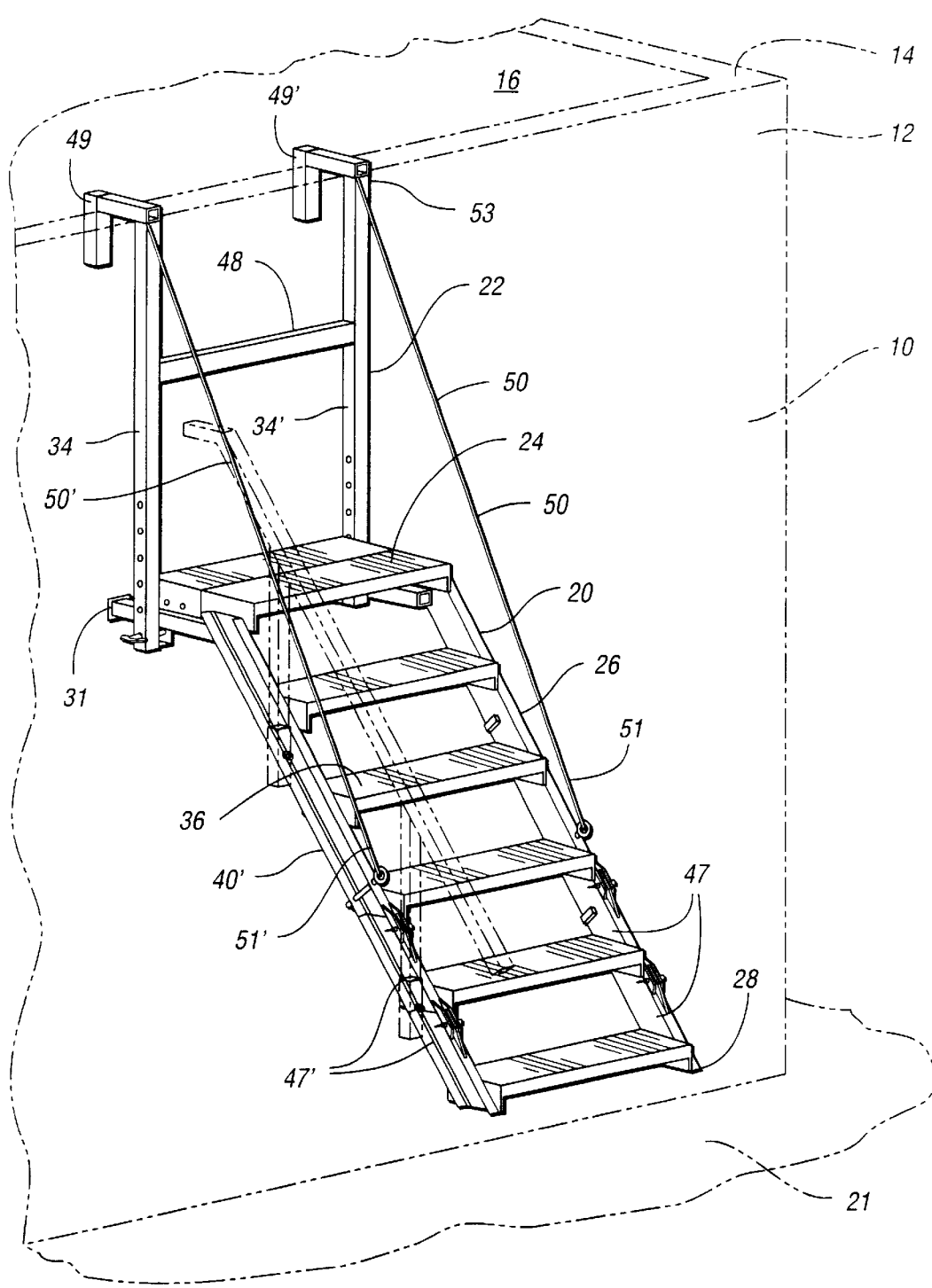
FIG. 1 is a perspective view of the adjustable ladder of this invention hanging on a fragmentary view of a ground-supported dumpster and selectively broken away to show the way the ladder hangs on the dumpster and floats above the ground. A one-piece handrail is shown in phantom as an optional addition.

With reference to FIG. 1, a dumpster 10 is shown with side walls 12 defining an upper rim 14 circumscribing the dumpster to define a cavity 16 for holding trash and debris. The dumpster ladder 20 of this invention is shown hanging from the upper rim of the dumpster which sets on and is supported by the ground 21.

Ladder 20 is comprised of three portions: a hook or hanger portion 22, a platform portion 24, and a step or stairway portion 26. When hanging on the dumpster, the lowest extremity 28 of the stairway portion 26 is spaced up to 10 inches above the ground so that the stairway portion floats sufficiently above the possibly unstable ground so that the ground will not affect the stability of the ladder when a person mounts the ladder.

The parts of the ladder will now be described with reference to FIGS. 1–4. All parts are aluminum unless otherwise specified. Pins, bolts, cable and chain are steel.

Welded plate 31 forms a foot to cushion telescoping tubing 32 where the ladder bears against the dumpster side wall for lateral support as the ladder hangs from the rim.

Telescoping tubing or foot arm 32 is adjustable to keep the stair treads 36" parallel to ground 21 when loads are being supported on the ladder.

Foot arm sleeve 33 holds the foot arm 32 in place.

Long tubes 34, 34' are added to crooked short tubes 49, 49' at their respective ends to form a hook for hanging the ladder on the dumpster. The short tubes 49,49' may be formed with shapes other than a crook in order to mate or complement the dumpster rim 14. For example, the horizontal tubes 30, 30' between hook portions 34, 34' and 49, 49', respectively, may be segmented so that they can be sufficiently adjustable to accommodate different rim widths.

Square spacer 35 secures the upper stair treads 36, 36' to form the platform 24 on which a worker or loader stands. Other stair treads 36' form the stairway leading to the platform.

Cotterless hitch pin 37 secures the telescoping foot arms 32, 32' underneath the platform 24. Hitch pin 38, 38' (with cotter pin) connects the hooks 49, 49' and platform/stairway together.

Hex head bolts 39, 39' connect stair treads and platform to C-beams or side rails 40, 49'. The C-beams form risers on each side of the ladder for holding the stair treads and platform in place.

Steel hinges 41 connect adjacent C-beam sections to allow the upper and lower stairway to fold. The hinges are fastened to the C-beams by coneheaded machine bolts 42. A latch 43 holds the folded stairway sections in place. A locking pin mechanism 44 cooperates with cotterless hitch pin 45 to hold the unfolded stairway sections in place.

Eye bolts 46 hold carabineer 42 (O-shaped ring with a spring catch on one side) attached to chain or cable 50. The cable is plastic coated steel sufficiently strong to support the loads on the stairway and platform. Another small C-beam section 47 at the bottom of the stairway allows the stairs to fold.

Connecting tubing 48 may be used to connect and stabilize the two hooks 49, 49'-34, 34'. However, if such connecting tubing is used, it should not appear as something to climb on such as a stair tread. The hook or hanging portion should not have a step for climbing above the platform when loading debris into the dumpster, i.e., the hanging portions should be sufficiently stepless that the person loading the dumpster (or perhaps a child) would not be encouraged to or enabled to climb above the platform.

Each chain or cable 50 has an adjuster (such as a turnbuckle) 51 for shortening or lengthening the cable.

Cable fasteners and thimbles 53, 53' are located at the cable end connected to the hooks 49, 49' used to hang the ladder on the dumpster. Such fasteners hold the looped top ends of the cables in place.

The parts of the design are described in greater detail below. The numbered sections below correspond to the numbered parts above that need further explanation.

1. Feet (31,31', 32,32', 33,33')

Two small, adjustable feet 31,31' are underneath the platform 24. Two telescoping tubes 32,32' fit inside two sleeves 33,33' welded to the underside of the platform. Six holes 60,60' 1½" apart from center-to-center, allow for length adjustments of the supporting feet to accommodate any dumpster shape. These feet support large loads placed on the stairs and keep the steps 36 parallel to the ground.

2. Hooks and Height Adjustment (34,34', 49,49')

The hooks 49,49' attached to the loader 20 to the dumpster 10. The foldable stairs have a pinhole system for major adjustments. The pinhole system on the hooks makes it simple to adjust the height of the first stair to a comfortable level. Six holes 62,62' each three inches apart (center-to-center), allow for minor adjustments to platform and step heights. Depending on landscape, the first step may be any height up to 10". The hook portions 30, 31' which abut the dumpster rim may be adjustable to accommodate different rim shapes.

3. Stair Risers

The height between each step or stair tread is 9½". This allows for only five steps instead of six, saving weight and time for construction workers quickly ascending the stairs.

4. Stair Treads (36, 36' and 36")

The size of each step or tread is 9". Steps of this size were found to be the most practical, and most readily available for use in the prototype. The size of the platform 24 is 18" (two 9" treads welded together). This size is safe and comfortable for users carrying large items on the platform.

5. Hitch Pins (37, 38 and 45)

Several types of hitch pins may be used. Cotterless hitch pins, which have spring-loaded ball bearing protrusions to prevent the pins from accidentally slipping out, worked best since there were no cotter pins to lose. These pins take very little time and effort to insert and remove. All pins on the ladder are of this type except those hitch pins (with cotter pins) at the tubular base 34,34' of the hooks 49,49'. Cotterless pins that are long enough at this location are preferable.

6. C-Beam Risers (40,40')

C-beam risers 40,40' are used to reduce weight. Four inch wide C-shaped beams withstand all loads expected on the structure. Also, C-beams allow for easier grasping of the sides of the stairs when moving the ladder from place-to-place.

7. Foldable Stair Hardware (41, 42, 43, 44 and 45)

The hinges 41 for the foldable stairs include locking mechanisms to hold the foldable stairs in the unfolded position. They provide sufficient support for large loads imposed upon the structure. A pin 45 through three plates (FIG. 2) is welded onto the top of the C-beams 40,40'. They provide a greater distance from the pin to the hinge. This greater moment arm means that the pin/plate mechanism must withstand less force in the side of the C-beam. Three plates were used to ensure that the pin stays horizontal (see FIG. 2). When the lower stairs 28 are folded under, they are kept in place by small steel latches. These are convenient and lightweight.

8. Cables and Accessories (46, 50, 51, 52 and 53)

Two cables 50,50' are connected to several inches of chain 51,51' at the bottom. A carabiner that hooks into the eyebolt on the C-beam can hook through different links of the chain to adjust the length of the cable for different heights of the hooks 49,49'. The use of these cables handle the large loads on the structure. These cables significantly reduce weight and provide adequate support for the stair structure. They are also less bulky-an important advantage in the portability of the ladder. Additionally, the cables serve a dual purpose; when the ladder is folded up into its portable configuration, the cables hold the structure in place so it is simple to carry, as seen in FIG. 5.

9. Part Material (all parts)

The ladder is made of aluminum with the exception of the steel cable, pins, chain, and bolts. Aluminum was chosen because it has a higher strength-to-weight ratio than steel. Users of this ladder should be able to lift it easily and carry it from the job site to their vehicles, making the structure weight very important to the design. Also, it is desirable to make all main parts aluminum to allow them to be welded together.

Stress and Weight

Stress is calculated using a 240 lb. man carrying 80 lbs. of debris. To further ensure the safety of the structure, the stress calculations are based on one-half of the design, that is, one "C" beam, one "nook", one cable, and one of any pair of pins or pair of pinholes. For instance, if someone were to step on the far left of the lowest stair, much of the weight would probably be carried through the left-hand members. In this situation, stresses in the members may reach undesirable levels. If the load is shared at all by the right-hand members, then the stresses decrease in the left-hand members. Therefore, calculating stresses for one side will produce a very safe structure.

Beam Stress

Beam stress is a driving design factor leading to the preferred aluminum design with an estimated weight of 62 lbs.

Pin and Bolt Stress

⅜" pins are used because they are available in a variety of lengths and in cotterless form.

Bearing Stress

If the thickness of the C-beam where the pins are inserted is too thin, there is a tendency for the pin to buckle the side of the pin hole under compression, and as a result, lengthen the hole on the aluminum surrounding the eyebolt. In the C-beam, the flange opposite of the eye on the eyebolt prevents the rotation.

Method of Manufacturing

A. Stairs and Risers

The stair/riser section is constructed out of C-beam. A miter box may be used to cut the two folding steps and the ends of the risers to the required fifty-degree angle and specified length. The first step starts at the very bottom of the C-beam risers, and the distance to each consecutive step is measured and marked. Each stair tread is bolted to the structural C-beam and lock washers are used to ensure that the bolts stay tightened. Steel hinges are used to connect the folding steps 47,47' to the rest of the riser structure because they are stronger, more durable, and readily available. The hinges are bolted onto the C-beams using half-inch high-grade steel bolts with lock washers; this prevents the bolts from loosening.

At the very top of the riser structure, the two outer tubes or foot arm sleeves 33,33' for the telescoping leg supports 32,32' are welded onto the inside surface of the risers using a TIG welder and a 5080 aluminum filler rod. The platform (composed of two stairs welded together) is welded on top of this. Beneath the platform and the outer leg support tube 35,35', a 2"×2"×2" tube section is welded to hold the pin 38,38' for the hook tube 34,34'.

B. Sliding Support Leg Members

The outer sliding support member 33,33' has one hole drilled in each to accommodate the adjustment pin 37,37', and is welded to the top inside of the stair riser section as described earlier. The inner member is milled on two adjacent sides so as to have a total clearance of ¹⁄₃₂" from the inside of the outer support leg member tubing. To the end of the inner support member, a slip resistant "foot" 31,31' is attached to prevent the whole mechanism from sliding on the dumpster.

C. The Hooks

The vertical hook arm members are cut from the same 2"×2"×0.125" aluminum tubing as the sliding support leg members 33,33'. Upon completion of this, the hooks are welded together using the same materials and processes described earlier.

D. Locking Mechanism for the Unfolded Steps

To hold the folding steps in place while folded out, thin plates (FIG. 2) of material are welded to the top of the C-beam. Small holes are drilled through these plates to accommodate a pin 45,45', creating a locking mechanism for the folding part of the stairs.

E. Cables

The cables are cut to length after threading them through the holes in the top of the hook. This end is folded over and clamped using ¼" cable clamps. The other end is wrapped around the chain links and clamped in the same fashion as the other end. The other end of the chain is then attached to a carabiner, which is attached to the eyebolt on the stair risers.

F. Locking Mechanism for Folded Stairs

A locking mechanism is used to secure the bottom two steps when in their folded position. The locking mechanism may be fastened to the C-beam risers using 6–32 machine bolts and lock washers to ensure that the bolt will not come loose. The locking mechanism will share a clasp with two hooks so that when only one step is folded up the clasp will be on one hook, and if two steps are folded up, the clasp will attach to the other hook.

G. Hinges

Steel hinges were bolted to the folding portion of the risers. They are secured by drilling holes, tapping them, and inserting bolts.

H. Pins

Cotterless pins of varying lengths are used to pin joints and adjustable mechanisms together, except on the hook mechanisms, where a 4" hitch-pin (with cotter pin) is used. The pins are attached to the dumpster loader using a tether (1/16" cable). The cable is looped back upon itself and crimped on both ends. One end is hooked to the pin's key-ring and the other is secured to the dumpster ladder with a screw and lock washer. The hole for the screw is drilled and tapped to secure the screw to the dumpster loader.

I. Feet

A plate 31, 31' is welded on each tube 32, 32' as a foot to orient the ladder and its treads on the dumpster. A handrail, if desired, may be made out of aluminum tubing which may be cut and welded in the same fashion as the C-beam risers (see phantom in FIG. 1). The bottom four inches of a handrail leg may be milled to fit into sleeves that may be attached to the inside surface of the risers. A small collar may be cut and welded to the bottom of the handrail legs to keep the handrail from falling below a preferred height of 32". Holes will then be drilled through at least one of the handrails and sleeves so that a pin may be installed to lock the handrail in place.

In sum, the portable ladder of this invention:
- allows for quicker and more efficient loading of a dumpster;
- is easily moved around the dumpster;
- makes it possible for one person to transport the ladder to and from construction sites due to its compact size (FIG. 5);
- is easily assembled and set up on the dumpster;
- accommodates all dumpsters and landscapes (as shown in FIGS. 6 and 7);
- is durable and affordable; and
- can be provided with a handrail if desired.

Method of Usage

1. Place the stair platform apparatus on the ground with the stair treads facing downward.
2. Place the feet into their respective shafts located near the platform base.
   a. If the desired location of the feet is known, they may now be positioned by placing the respective attached pin into the telescoping member,
   b. If the desired position is unknown, push the telescoping feet inward until they reach the last pinhole position; they may be adjusted later.
3. Inspect the bottom two steps on the stair platform apparatus to verify that the hinges are securely latched.
   a. To latch the hinge, pull up on the small tab and then pull over to the corresponding locking member,
   b. Place the angled tip of the tab into the locking member and press down until the mechanism is locked,
   c. Check the latch by tugging on each respective part that the latch is holding together. If there is any movement, you must re-latch the mechanism.
4. If the desired stair height is known, the stairs may now be folded.
   a. The stairs may be folded in three positions: fully extended, one stair tread folded up, or two stair treads folded up,
   b. To fold the stairs if the fully extended option is not desired, pull the two pins out of the respective pinholes along the joint that you desire to fold up,
   c. Grab hold of the bottom stair(s) that you wish to fold up and rotate them toward the platform base making sure that the latches that are unconnected do not fall under the rotting stair(s),
   d. Attach the corresponding latches into their locked position to secure the retracted stairs (see step 3 for further explanation).
5. If the desired height is unknown, retract two stairs into their folded position. They may be adjusted later if this is not an acceptable position (see step 4 for further explanation).
6. Flip the dumpster ladder over so that the stair treads face upward.
7. Attach the hook mechanism to the platform.
   a. Take out the two pins from the base of the platform. These may be removed by pulling out the cotter pin located at the end of the pin that is positioned underneath the platform base,
   b. Position the hook mechanism above the platform with the two extending beams facing the platform and the hooks facing away from the dumpster loader,
   c. Grab hold of the platform base and pull the stair platform apparatus off the ground until the desired height above ground is reached on the extended beams of the hook mechanism,
   d. When the desired height is reached, push the pins into their respective holes and replace the cotter pin to lock the pins into place.
8. Grab hold of one of the steel cables with one hand while holding onto the hook mechanism with the other.
9. Pull the steel cable taut and let go of the hook mechanism.
10. Slowly let up slack on the steel cable while walking toward the eyehole with the accompanying carabiner located near the second step of the stair platform apparatus.
11. Choose a link of the steel chain attached to the cable to lock into the carabiner; remember to make sure that the cable is taut.

a. Pressing on a hinge opens the carabiner, whereupon the chain link may be slipped over the open carabiner and locked into position.
12. Repeat step 11 for the other steel cable.
13. To attach the dumpster ladder onto the dumpster, you must first position yourself to one side of the apparatus; parallel to a line drawn from the base of the stairs to the platform.
14. Grab hold of the extended beam of one hook with one hand and the underside of the platform base with the other.
15. Lift up until the bottom tip of the hooks are above the top rim of the dumpster.
16. Pull the dumpster ladder toward the dumpster and let the hooks fall into position around the rim of the dumpster.
17. The feet may now be adjusted if necessary by using the pins located on the telescoping member; it may be necessary to pull the base of the platform away from the dumpster at an angle to effectively reposition the telescoping feet (see step 2).
18. Re-inspect all hinges and pins on the dumpster ladder and heed all warnings before using.

Operation

1. The dumpster ladder is intended for use on conventional construction site dumpsters as well as on other businesses' dumpsters.
2. Debris is loaded into the dumpster by walking up the stair treads and loading the dumpster while standing on the platform of the dumpster ladder.
3. The dumpster ladder is intended for use by one person.
4. The dumpster ladder is designed to hold 320 pounds.
5. Stair treads are absent from the hook portion of the ladder so that children are not tempted to climb to the rim of the dumpster.
6. The ladder is folded so as to be portable and transportable between construction sites.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A portable ladder to aid a person in loading dumpsters of different heights which are on a dumpster supporting site which may be unstable, the ladder comprising:

a hook portion having a plurality of vertically spaced apertures adapted for connecting the ladder to a dumpster of predetermined height and shape;

a platform for the person;

a pin releasably locking the hook portion and the platform portion in one of said plurality of vertically spaced apertures to vertically adjust the platform portion with respect to the hook portion at a desired height sufficient to enable the person when on the platform portion to see how the dumpster is being loaded;

a ladder portion depending from the platform portion, and comprising an upper ladder section fixed to the platform portion at an obtuse angle with respect to the platform portion to extend outwardly from the dumpster, and a lower foldable ladder section pivotally attached to the upper ladder section so that the fixed section and the foldable section can lay side by side; and a support portion for the ladder portion suspended from the hook portion and positionable at an angle sufficient with respect to the dumpster supporting site for spacing the ladder portion above the dumpster supporting site.

2. The portable ladder of claim 1 wherein the person is a child and the hook portion includes a step that is sufficiently above the platform portion that the child cannot step above the platform portion.

3. The portable ladder of claim 1 wherein the support portion is flexible.

* * * * *

UNITED STATES PATENT AND TRADEMARK OFFICE
CERTIFICATE OF CORRECTION

PATENT NO.     : 6,401,861 B1
DATED          : June 11, 2002
INVENTOR(S)    : Steven James Marszalek It is certified that error appears in the above-identified patent and that said Letters Patent is hereby corrected as shown below:

<u>Column 10,</u>
Line 14, "a platform for…" should be -- a platform portion for… --

Signed and Sealed this

Twelfth Day of November, 2002

Attest:

Attesting Officer

JAMES E. ROGAN
Director of the United States Patent and Trademark Office